United States Patent Office 3,711,535
Patented Jan. 16, 1973

3,711,535
PROCESS FOR RECOVERING ALUMINUM ALKYLS OF SELECTED MOLECULAR WEIGHT USING COMPLEXES
Paul Kobetz and Kenneth L. Lindsay, Baton Rouge, La., assignors to Ethyl Corporation, New York, N.Y.
No Drawing. Filed Sept. 25, 1970, Ser. No. 75,702
Int. Cl. C07f 5/06
U.S. Cl. 260—448 A
35 Claims

ABSTRACT OF THE DISCLOSURE

It is disclosed that exchange reactions occur with certain 2:1 complexes of aluminum trialkyls and various complexing agents such as sodium fluoride and sodium cyanide. Complexes containing one mol of lower alkyl trialkyl aluminum and one mol of different higher alkyl trialkyl aluminum per mol of complexing agent are formed from complexes containing two mols of lower alkyl trialkyl aluminum per mol of complexing agent. The reactions are useful in producing aluminum trialkyls and olefins of selected or "peaked" molecular weights without requiring complicated and expensive distillation equipment. Various complexes produced are novel and useful as intermediates in various reactions.

BACKGROUND OF THE INVENTION

Field of the invention

The invention relates to hydrocarbyl aluminum compounds and in particular to exchange reactions wherein starting 2:1 complexes containing trialkyl aluminum of selected molecular weight are reacted with feed trialkyl aluminum of different molecular weight to produce product 2:1 complexes containing at least some feed trialkyl aluminum liberating trialkyl aluminum corresponding to that of the starting complexes.

Description of the prior art

Some complexes of aluminum alkyl compounds have been used in the prior art for various purposes such as separating mixtures of triethyl aluminum and olefins. Typical of art in this area is U.S. Pat. 3,415,862 and the references cited therein. Such processes are characterized by the formation of 2:1 molar complexes of triethyl aluminum and complexing agent from 1:1 complexes thereof to pick up triethyl aluminum and by the heat-pyrolysis of such complexes in a different environment to release $R_3Al$ to regenerate 1:1 complexes for $R_3Al$ pick-up of additional $R_3Al$. Such processes provide for the removal of $R_3Al$ from olefins which have similar vapor pressures precluding ordinary distillation separations.

Other prior art in the area is Annalen der Chemie, vol. 629, Nos. 1–3, March 1960, page 34, lines 6–8, wherein it is stated that complexes containing aluminum trialkyl $(C_nH_{2n+1})_3Al$ are detectable where $n=4$ but that above $n=6$ the complexes are unstable.

SUMMARY OF THE INVENTION

The present invention relates to an aluminum chemistry process for producing hydrocarbyl aluminum complexes and for recovering volatile hydrocarbyl aluminum from a mixture of hydrocarbyl aluminum compounds of different volatilities. The process involves forming a mixture containing: (1) a 2:1 equivalent molar complex of hydrocarbyl aluminum and a complexing agent, and (2) free hydrocarbyl aluminum.

The mixture of complex and free hydrocarbyl aluminum is distilled to produce: (1) an overhead stream of free hydrocarbyl aluminum enriched in the more volatile (lower) hydrocarbyl aluminum constituency of the mixture, and (2) a 2:1 molar complex of hydrocarbyl aluminum and the complexing agent wherein the hydrocarbyl aluminum is enriched in the less volatile hydrocarbyl aluminum constituency of the mixture. In the broader aspects, this invention involves the formation of novel complexes containing higher hydrocarbyl radicals or groups such as octyl, dodecyl, eicosyl and the like as well as certain novel complexes also containing lower hydrocarbyl groups such as ethyl and butyl radicals.

The process is further characterized in that the hydrocarbyl aluminum is of the generalized formula: $R_2AlR'$, wherein the R radicals are similar or different individual hydrocarbyl radicals having from about 2 to about 30 carbon atoms, or mixtures of two or more thereof, generally in two different molecular weight categories of hydrocarbyl aluminum and R' is similar or different individual hydrocarbyl or hydrocarbyloxy radical having from about 2 to about 30 carbon atoms, or halogen. Preferred higher hydrocarbyl aluminum compounds contain some R groups individually having more than 4 carbon atoms. In many instances the compositions exhibit properties of being statistical mixtures of aluminum and hydrocarbyl radicals without specific restriction to the precise molecular arrangement and combinations thereof of the formula. That is, typical compositions containing equal molar proportions of ethyl and octyl R groups can also be represented by the equivalent formula:

$$2[(C_2H_5)_{1.5}(C_8H_{17})_{1.5}Al]:\frac{1}{t}MX_t$$

The general equivalent of this formula is $$2[R_2AlR']:\frac{1}{t}MX_t$$

An equivalent mol of the complexing agent for two mols of $R_2AlR'$ in 2:1 molar complexes is:

$$\frac{1}{t}MX_t$$

wherein M is alkali metal or alkaline earth metal; and X is halogen, cyanide, hydrocarbyloxy as defined for R', cyanate, azide or substituted amide. The symbol $t$ indicates a valence factor for M, being 1 where M is alkali metal and 2 where M is alkaline earth metal. Useful compositions contain one or mixtures of two or more different R, R', M or X components.

The substituted amide complexes include those with two compatible hydrocarbyl groups or radicals similar to those defined for individual R's in the foregoing including methyl groups or radicals. In general, compounds with lesser substitution per molecule tend to react adversely because of the active hydrogen.

The distilling step of the present process set forth in the foregoing is performed at a suitable vapor temperature for the more volatile hydrocarbyl aluminum compounds involved and depends upon the structure and vapor pressure of the more volatile aluminum compounds separated. Separations of close boiling hydrocarbyl aluminums are enhanced without the need for molecular distillation by using proportions wherein the mixtures fed to distillation contain about the desired amount of mols of free hydrocarbyl aluminum in excess of that in 2:1 complexes that is to be removed in the distillation. Temperatures range from about 80° C. to about 175° C. and pressures range from about 1.0 to about 70 millimeters of mercury absolute. In general, desired operation always remains below the pyrolysis temperature for the conversion of the 2:1 molar complexes into a 1:1 molar complexes or for the liberation of olefins. Generally speaking, the higher temperatures and/or lower pressures of the ranges recited are required where the "more volatile" category of hydrocarbyl aluminum includes compounds of higher molecular weight than triethyl aluminum, such as tri-n-butyl aluminum.

A narrower preferred range for the vapor temperature of the distilling step of the present process is from about 90° C. to about 125° C. A narrower preferred range for the pressure of the distilling step of the present process is from about 2 to about 20 millimeters of mercury absolute. A typical preferred set of conditions for the distilling step include a vapor temperature of about 110° C. and a pressure of about 5 millimeters of mercury absolute for triethyl aluminum. Similar typical conditions for a more volatile category including tripropyl aluminum is 120° C. at 5 mm. Similar typical conditions for a more volatile category including tri-n-butyl aluminum is 140° C. at 2 mm.

Preferred hydrocarbyl aluminum compounds are trihydrocarbyl wherein R′ is hydrocarbyl radical having from about 2 to about 30 carbon atoms and is similar to or different from R.

Particularly preferred $R_2AlR'$ compounds are trialkyl aluminum compounds.

Preferred M components of the complexes are sodium, potassium, rubidium, cesium, magnesium and calcium, individually and in mixtures such as 2/1, 1/1 and 1/2 molar ratios of sodium and potassium or calcium and magnesium. Of these, sodium or potassium is preferred.

Preferred X components of the complexes are cyanide, phenoxy, methoxy, azide and halogen, particularly fluoride.

Preferred specific $MX_t$ compounds useful as complexing agents because of their properties of forming complexes with hydrocarbyl aluminums in a ratio of 2 mols of hydrocarbyl aluminum per equivalent of complexing agent are: magnesium fluoride, sodium fluoride, sodium cyanide, potassium fluoride, sodium phenoxide, and sodium methoxide. These complexes also have the advantage of being highly insoluble in various olefins which is conducive to excellent phase separations on a solubility basis in certain instances.

Preferred more volatile hydrocarbyl aluminum compounds are triethyl aluminum, tripropyl aluminum, and tri-n-butyl aluminum or mixtures thereof. Of these triethyl aluminum and mixtures of triethyl aluminum and tri-n-butyl aluminum are particularly preferred because of their stability characteristics and their utility in the production of predominantly straight chain olefins and aluminum alkyls having even numbers of carbon atoms per molecule.

Preferred less volatile hydrocarbyl aluminum constituency is one or a mixture of two or more higher hydrocarbyl trihydrocarbyl aluminum compounds having more than four carbon atoms per hydrocarbyl radical and up to about 30 carbon atoms per hydrocarbyl radical. Such constituency is typically formed by chain growth of trialkyl aluminum with ethylene in accordance with teachings in U.S. Pat. 3,384,465.

Classifiable in both volatility categories are certain compounds such as tri-n-butyl aluminum, tri-n-pentyl aluminum and tri-n-hexyl aluminum, usually depending on the presence or absence of other alkyl constituency. Thus n-butyl aluminum is also in the less volatile category when the distillation is performed to separate triethyl aluminum as a more volatile or it may be in the more volatile category if the distillation conditions are so controlled to remove it with the triethyl aluminum or alone if triethyl aluminum or tripropyl aluminum or the like is absent. In many instances, particularly with flash distillations, some "higher alkyls" such as n-butyl aluminum or propyl aluminum distill over with the more volatile (typically ethyl) aluminum. Inasmuch as many of the present separations and compositions are favorably influenced by the situation that there is a fundamental difference of molecular weight and vapor pressure between the lower and higher hydrocarbyl trihydrocarbyl aluminums, many preferred compositions produced by the present invention contain at least two different hydrocarbyl compounds or compound ranges in a mol ratio of about 1:1 of one range relative to the other range, the more volatile range including, for example, ethyl aluminum, propyl aluminum and n-butyl aluminum, individually or in mixtures of two or all three.

Preferred mixtures frequently include n-hexyl aluminum and/or n-octyl or n-dodecyl aluminum, or other similar higher alkyl trialkyl aluminum compounds as the less volatile constituency in a 1:1 molar ratio relative to the typical more volatile compounds or compound ranges set forth in the preceding paragraph.

The present invention also teaches that stable higher hydrocarbyl, hydrocarbyl aluminum complexes such as

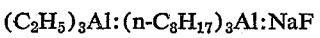

and

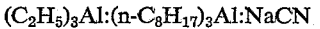

are formed despite the prior art teaching that such complexes cannot be formed.

Preferred mixtures of free hydrocarbyl aluminum and 2:1 molar complexes of hydrocarbyl aluminum and complexing agent

contain from more than 2 up to about 10 molecules of hydrocarbyl aluminum per equivalent mol

This range is imposed by the need for some "free" hydrocarbyl aluminum for the distillation without requiring pyrolysis of the 2:1 complexes and by the generally poorer selectivity of distillation with the higher ratios where the percentage effect of the complexes is lessened.

In a particularly preferred embodiment of the process of the present invention, the forming step includes the step of reacting (1) a preformed 2:1 complex of trialkyl aluminum and complexing agent

wherein the alkyl radicals include at least some ethyl radicals, and (2) trialkyl aluminum containing at least some alkyl radicals having more than two carbon atoms per radical, and wherein the more volatile hydrocarbyl aluminum obtained from the distilling step consists essentially of triethyl aluminum.

In certain particularly preferred embodiments of the process of the present invention, the forming step includes the step of reacting (1) about one equivalent mol of a starting 2:1 molar complex of trialkyl aluminum containing at least some ethyl alkyl radicals (plus a complexing agent as defined in the foregoing), or the constituents of such complex, with (2) free trialkyl aluminum containing at least about 1 mol of trialkyl aluminum whose alkyl radicals are higher than ethyl; and wherein the total complex plus free trialkyl aluminum feed includes from 1 to 2 mols of ethyl alumiinum constituency per mol of complex, and wherein the overhead stream from the distillation includes triethyl aluminum in an amount of up to about one mol or about the excess above 1 mol of triethyl aluminum per mole of complex in the total feed to the forming step. Particularly preferred in this connection is the combination wherein about 100 percent of the alkyl radicals of the starting complex or its constituents are ethyl radicals and the alkyl groups of the feed free trialkyl aluminum are butyl and higher.

The forming and distilling steps are preferably performed in two separate stages plus a preforming stage for the complex or in a single stage in a pot type reactor or in a countercurrent contacting in a packed or staged bed or tower contacting system, the more volatile hydrocarbyl aluminum compound or compounds being removed as a vapor with the assistance of the proper temperature and pressure and with or without the use of a compatible stripper gas such as nitrogen or hydrocarbon.

In a particularly useful embodiment, the present invention relates to an exchange process for forming complexes containing $R_3Al$ wherein R is alkyl having from about 4 to about 30 carbon atoms. In this process, $R_3Al$ is reacted with a 2:1 complex of the type:

$$a(R'')_3Al : bR_3Al : \frac{1}{t} MX_t$$

In this complex, M is alkali metal, $t$ is 1, X is fluoride, phenoxy, methoxy, cyanate, cyanide, azide, or substituted amide, R'' is an individual lower alkyl radical having from about 2 to about 6 carbon atoms or a mixture of two or more thereof, wherein at least one component $(R'')_3Al$ compound is more volatile than $R_3Al$, where $a$ is from >1 up to 2, inclusive, and $a+b=2$.

The reaction is performed at a temperature from about 0 to about 190° C. at a pressure from about 5 p.s.i.a. to about 100 p.s.i.a. and for a time from about 0.1 second to about 1 hour. From the reaction mass there is distilled $(R'')_3Al$ at a temperature from about 80° to about 175° C. and at a pressure from about 1.0 to about 70 mm. Hg absolute to remove at least a part of the $(R'')_3Al$ without forming 1:1 complexes, leaving a 2:1 complex of the type:

$$a'(R'')_3Al : b'R_3Al : \frac{1}{t} MX_t$$

This new complex is characterized by having less $(R'')_3Al$ than the starting complex; viz, $a'+b'=2$, $a'/b'<a/b$. Where the feed $R_3Al$ contains some $(R'')_3Al$ components, those generally go to the residual complex or are distilled over.

Narrower more preferred ranges of conditions for the reacting step of the present process include a temperature from about 75 to about 150° C., a pressure from about 10 p.s.i.a. to about 20 p.s.i.a. and a time duration from about ½ second to about 15 minutes. Typical conditions for the reacting step are about 125° C., about atmospheric pressure, a reaction time of about 5 minutes.

The present process is suitably performed in diluent media if desired. Typical media is predominantly alpha mono-olefins having from about 14 to about 30 carbon atoms per molecule which remain with the complex from distillation. Lighter olefins such as butene-1 included may provide an additional function as a stripping agent to enhance the distillation. In such instances, sodium fluoride and potassium fluoride are particularly useful complexing agents. Many of the higher alkyl complexes, even $(C_2H_5)_3Al:(octyl)_3Al:NaCN$, are quite viscous, making the use of diluents desirable.

Another particularly desirable embodiment of the present process is useful for forming complexes containing $R_3Al$ wherein R is alkyl having from about 4 to about 30 carbon atoms. In this embodiment, about 1 mol of free $R_3Al$ is reacted with one mol of a starting complex of the type $$2(R'')_3Al : \frac{1}{t} MX_t$$

wherein M is alkali metal, $t$ is 1, X is fluoride, phenoxy, methoxy, cyanide, or cyanate, and R'' is ethyl or propyl, or a mixture thereof.

This reaction produces up to about 1 mol of free $(R'')_3Al$ per mol of feed complex plus one mol of a mixed complex of the type $$(R'')_3Al : (R)_3Al : \frac{1}{t} MX_t$$

and is performed at a temperature from about 0 to about 190° C., at a pressure from about 5 p.s.i.a. to about 100 p.s.i.a. and at a time from about 0.1 second to about 1 hour. From the reaction mass there is distilled up to about 1 mol of free $(R'')_3Al$ at a temperature from about 80° C. to about 175° C. and at a pressure from about 1.0 to about 70 mm. of Hg absolute. This removal of the free $(R'')_3Al$ produced by the reaction leaves a 2:1 complex of the type:

$$(R'')_3Al : R_3Al : \frac{1}{t} MX_t$$

In a subsequent operation where desired, olefins (R—H) are readily obtained from this complex by a displacement type of reaction with ethylene. Such displacement regenerates the starting $$2(R'')_3Al : \frac{1}{t} MX_t$$

complex for recycle or other uses. These complexes are characterized by control of compositions in that one can maintain precise control over the $a/b$ and $a'/b'$ ratios.

The present invention thus uses or produces numerous complexes not heretofore known.

The process of the present invention makes it possible to produce with excellent control over composition and proportions, complexes of the form $$1(R'')_2AlR' : 1R_2AlR' : \frac{1}{t} MX_t$$

wherein R is hydrocarbyl radical individually having from about 2 to about 30 carbon atoms, preferably from 4 to about 30 carbon atoms, preferably averaging more than 4 carbon atoms, R' is hydrocarbyl or hydrocarbyl oxy radical individually having from about 2 to about 30 carbon atoms, or halogen, R'' is hydrocarbyl radical individually having from about 2 to about 6 carbon atoms preferably from 2 to 4 carbon atoms, preferably averaging less than 4 carbon atoms, wherein at least $1(R'')_2AlR'$ compound is more volatile than $R_2AlR'$, M is alkali metal or alkaline earth metal, $t$ is a valence factor for M, being 1 where M is alkali metal and 2 where M is alkaline earth metal, and X is halogen, cyanide, hydrocarbyloxy radical as defined for R', cyanate, azide or substituted amide.

The foregoing formula for the complexes indicates generally 2 mols of hydrocarbyl aluminum per equivalent mol of complexing agent. It also indicates certain preferred complexes wherein the two mols of hydrocarbyl aluminum ar substantially equally divided (mol-wise) into lower molecular weight hydrocarbyl aluminums such as triethyl aluminum and higher molecular weight hydrocarbyl aluminum such as tri-n-octyl aluminum, tri-n-tetradecyl aluminum and the like, individually and in mixture up to about tris-triacontyl aluminum. Such mixed alkyls have excellent composite properties and are readily produced by the present process.

In certain preferred embodiments of the foregoing compositions of matter, the components designated by X are the same. In certain preferred compositions of the foregoing, the components designated by R' are the same. In certain compositions of matter of the foregoing, the components designated by X and R' are the same.

Preferred embodiments of the present invention relate to compositions of matter as follows:

$$1(R'')_3Al : 1R_3Al : \frac{1}{t} MX_t$$

wherein R is an alkyl radical individually having from about 4 to about 30 carbon atoms, R'' is alkyl radical individually having from about 2 to about 6 carbon atoms, wherein at least one $(R'')_3Al$ compound is more volatile than $R_3Al$, M is alkali metal or alkaline earth metal, $t$ is a valence factor for M, being 1 where M is alkali metal and 2 where M is alkaline earth metal, and X is halogen, cyanide, alkoxy radical having from about 2 to about 30 carbon atoms, cyanate, azide, or substituted amide, or a mixture of two or more thereof.

A preferred composition of matter in accordance with the present invention is $$1(C_2H_5)_3Al:1R_3Al:\frac{1}{t}MX_t$$

wherein R is hydrocarbyl radical individually having from about 4 to about 30 carbon atoms, M is alkali metal or alkaline earth metal, $t$ is a valence factor for M, being 1 where M is alkali metal and 2 where M is alkaline earth metal, X is halogen, cyanide, alkoxy radical having from about 2 to about 30 carbon atoms, cyanate, azide or substituted amide or a mixture of two or more thereof.

Another preferred composition of matter in accordance with the present invention is similar to that of the preceding paragraph with tripropyl aluminum substituted for triethyl aluminum.

Another preferred composition of matter in accordance with the present invention is $$1(R'')_3Al:1R_3Al:\frac{1}{t}MX_t$$

wherein R is alkyl radical individually having from about 4 to about 30 carbon atoms, R" is a mixture of ethyl and n-butyl radicals, M is alkali metal or alkaline earth metal, $t$ is a valence factor for M, being 1 where M is alkali metal and 2 where M is alkaline earth metal, X is halogen; cyanide, alkoxy radical having from about 2 to about 30 carbon atoms, cyanate, azide or substituted amide, or a mixture of two or more thereof.

A preferred composition of matter in accordance with the present invention is $$2(C_2H_5)_3Al:\tfrac{1}{2}Ca(OCH_2CH_2OCH_3)_2$$

Another preferred composition of matter in accordance with the present invention is $$2(C_2H_5)_3Al:\tfrac{1}{2}Mg(OCH_2CH_2OCH_3)_2$$

Typical complexes are:

$(C_2H_5)_3Al:(n-C_8H_{17})_3Al:NaF$
$(C_2H_5)_3Al:(n-C_8H_{17})_3Al:NaCN$
$(C_2H_5)_3Al:(n-C_8H_{17})_3Al:KF$
$(C_2H_5)_3Al:(n-C_8H_{17})_3Al:\tfrac{1}{2}Ca(OCH_2CH_2OCH_3)_2$
$(C_2H_5)_3Al:(n-C_8H_{17})_3Al:\tfrac{1}{2}Mg(OCH_2CH_2OCH_3)_2$
$(C_2H_5)_3Al:(n-C_8H_{17})_3Al:NaN(CH_3)_2$
$(C_2H_5)_3Al:(n-C_8H_{17})_3Al:NaN_3$
$(C_2H_5)_3Al:(n-C_8H_{17})_3Al:Na$ phenoxide
$(C_2H_5)_3Al:(n-C_8H_{17})_3Al:NaOCH_3$
$(C_2H_5)_3Al:(n-C_8H_{17})_3Al:NaOC_2H_5$ Other complexes are:

$(C_2H_5)_3Al:(n-C_8H_{17})_3Al:Na$ benzyloxide
$(C_2H_5)_3Al:(n-C_8H_{17})_3Al:Na$ cyclohexoxide
$(C_2H_5)_3Al:(n-C_8H_{17})_3Al:Na$ octenyl oxide
$(C_2H_5)_3Al:(n-C_8H_{17})_3Al:Na$ tolyloxide
$(C_2H_5)_3Al:(n-C_8H_{17})_3Al:Na$ xylyloxide
$(C_2H_5)_3Al:(n-C_8H_{17})_3Al:Na$ vinyloxide
$(C_2H_5)_3Al:(n-C_8H_{17})_3Al:Na$ diphenyloxide
$(C_2H_5)_3Al:(n-C_8H_{17})_3Al:Na$ octadecoxide
$(C_2H_5)_3Al:(n-C_8H_{17})_3Al:Na$ heptynyloxide
$(C_2H_5)_3Al:(n-C_8H_{17})_3Al:Na$ cumenyloxide
$(C_2H_5)_3Al:(n-C_8H_{17})_3Al:Na(4\text{-cyclohexenyl})$ oxide
$(C_2H_5)_3Al:(n-C_8H_{17})_3Al:Na(2\text{-phenethyl})$ oxide
$(C_2H_5)_3Al:(n-C_8H_{17})_3Al:Na$ triacontyl oxide
$(C_2H_5)_3Al:(n-C_8H_{17})_3Al:Na$ dimethylcyclohexyl oxide Other typical complexes are:

$(C_2H_5)_3Al:(n-C_8H_{17})_3Al:\begin{bmatrix}NaF\\KF\end{bmatrix}$ $(C_2H_5)_3Al:(n-C_8H_{17})_3Al:\begin{bmatrix}NaCN\\KCN\end{bmatrix}$ $(C_2H_5)_3Al:(n-C_8H_{17})_3Al:\begin{bmatrix}NaF\\KCN\end{bmatrix}$ $\begin{bmatrix}(C_2H_5)_3Al\\(n-C_4H_9)_3Al\end{bmatrix}:(n-C_8H_{17})_3Al:NaF$ $(C_2H_5)_3Al:R_3Al:NaF$ (R=individual or mixture of two or more hydrocarbyl radicals having 4–30 carbon atoms each, average more than 4)

$\begin{bmatrix}(C_2H_5)_3Al\\(n-C_4H_9)_3Al\end{bmatrix}:R_3Al:NaF$ (R=individual or mixtures of two or more hydrocarbyl radicals having 6–30 carbon atoms each)

Other typical complexes are:

$(C_2H_5)_3Al:(C_{18}H_{37})_3Al:NaF$
$(C_2H_5)_3Al:(cyclohexyl)_3Al:NaF$
$(C_2H_5)_3Al:(dimethylcyclohexyl)_3Al:NaF$
$(C_2H_5)_3Al:(vinyl)_3Al:NaF$
$(C_2H_5)_3Al:(octenyl)_3Al:NaF$
$(C_2H_5)_3Al:(phenyl)_3Al:NaF$
$(C_2H_5)_3Al:(tolyl)_3Al:NaF$
$(C_2H_5)_3Al:(xylyl)_3Al:NaF$
$(C_2H_5)_3Al:(benzyl)_3Al:NaF$
$(C_2H_5)_3Al:(2\text{-phenethyl})_3Al:NaF$
$(C_2H_5)_3Al:(cumenyl)_3Al:NaF$
$(C_2H_5)_3Al:(4\text{-cyclohexenyl})_3Al:NaF$
$(C_2H_5)_3Al:(heptynyl)_3Al:NaF$
$(C_2H_5)_3Al:(triacontyl)_3Al:NaF$
$(C_2H_5)_3Al:(citronnellyl)_3Al:NaF$ Other typical complexes are:

$(C_3H_7)_3Al:(C_{18}H_{37})_3Al:NaF$
$(C_3H_7)_3Al:(cyclohexyl)_3Al:NaF$
$(C_3H_7)_3Al:(dimethylcyclohexyl)_3Al:NaF$
$(C_3H_7)_3Al:(vinyl)_3Al:NaF$
$(C_3H_7)_3Al:(octenyl)_3Al:NaF$
$(C_3H_7)_3Al:(phenyl)_3Al:NaF$
$(C_3H_7)_3Al:(tolyl)_3Al:NaF$
$(C_3H_7)_3Al:(xylyl)_3Al:NaF$
$(C_3H_7)_3Al:(benzyl)_3Al:NaF$
$(C_3H_7)_3Al:(2\text{-phenethyl})_3Al:NaF$
$(C_3H_7)_3Al:(cumenyl)_3Al:NaF$
$(C_3H_7)_3Al:(4\text{-cyclohexenyl})_3Al:NaF$
$(C_3H_7)_3Al:(heptynyl)_3Al:NaF$
$(C_3H_7)_3Al:(triacontyl)_3Al:NaF$
$(C_3H_7)_3Al:(citronnellyl)_3Al:NaF$ Other typical complexes are:

$(n-C_4H_9)_3Al:(C_{18}H_{37})_3Al:NaF$
$(n-C_4H_9)_3Al:(cyclohexyl)_3Al:NaF$
$(n-C_4H_9)_3Al:(dimethylcyclohexyl)_3Al:NaF$
$(n-C_4H_9)_3Al:(vinyl)_3Al:NaF$
$(n-C_4H_9)_3Al:(octenyl)_3Al:NaF$
$(n-C_4H_9)_3Al:(phenyl)_3Al:NaF$
$(n-C_4H_9)_3Al:(tolyl)_3Al:NaF$
$(n-C_4H_9)_3Al:(xylyl)_3Al:NaF$
$(n-C_4H_9)_3Al:(benzyl)_3Al:NaF$
$(n-C_4H_9)_3Al:(2\text{-phenethyl})_3Al:NaF$
$(n-C_4H_9)_3Al:(cumenyl)_3Al:NaF$
$(n-C_4H_9)_3Al:(4\text{-cyclohexenyl})_3Al:NaF$
$(n-C_4H_9)_3Al:(heptynyl)_3Al:NaF$
$(n-C_4H_9)_3Al:(triacontyl)_3Al:NaF$
$(n-C_4H_9)_3Al:(citronnellyl)_3Al:NaF$ Other typical complexes are:

$(C_2H_5)_2AlCl:(C_8H_{17})_3Al:NaF$
$(C_2H_5)_2AlOC_2H_5:(C_{18}H_{37})_3Al:NaF$
$(C_2H_5)_2AlCl:(C_{18}H_{37})_2AlCl:NaF$

Other typical complexes are:

$(C_2H_5)_3Al:(n-C_8H_{17})_3Al:\tfrac{1}{2}\begin{bmatrix}Ca(OCH_2CH_2OCH_3)_2\\Mg(OCH_2CH_2OCH_3)_2\end{bmatrix}$ $(C_2H_5)_3Al:(n-C_8H_{17})_3Al:\tfrac{1}{2}[Ca(OCH_2CH_2OCH_2CH_2OCH_3)_2]$ $(C_2H_5)_3Al:(n-C_8H_{17})_3Al:\tfrac{1}{2}[Mg(OCH_2CH_2OCH_2CH_2OCH_3)_2]$
$(C_2H_5)_3Al:(C_{18}H_{37})_3Al:\tfrac{1}{2}[Mg(OCH_2CH_2OCH_3)_2]$
$(C_2H_5)_3Al:(cyclohexyl)_3Al:\tfrac{1}{2}[Ca(OCH_2CH_2OCH_3)_2]$
$(C_2H_5)_3Al:(phenyl)_3Al:\tfrac{1}{2}[Ca(OCH_2CH_2OCH_3)_2]$
$(C_3H_5)_3Al:(C_{18}H_{37})_3Al:\tfrac{1}{2}[Mg(OCH_2CH_2OCH_3)_2]$
$(C_3H_5)_3Al:(tolyl)_3Al:\tfrac{1}{2}[Ca(OCH_2CH_2OCH_3)_2]$
$(C_3H_5)_3Al:(xylyl)_3Al:\tfrac{1}{2}[Mg(OCH_2CH_2OCH_3)_2]$
$(n-C_4H_9)_3Al:(C_{18}H_{37})_3Al:\tfrac{1}{2}[Mg(OCH_2CH_2OCH_3)_2]$
$(C_2H_5)_2AlCl:(C_{18}H_{37})_2AlCl:\tfrac{1}{2}[Mg(OCH_2CH_2OCH_3)_2]$ The following examples indicate preferred embodiments of the present invention with respect to process and composition.

EXAMPLE I

A 500 ml. stirred round bottom distilling flask equipped with a side take-off connection was placed in an oil bath equipped with a heater and thermometer. The location of the thermometer measured the bottom temperature of the oil bath (the inside liquid temperature of the flask is about 10–20° C. lower than the actual thermometer reading). A second thermometer was placed in the vapor stream to measure overhead vapor temperatures. To the flask was added 4.0 grams (0.095 mol) of sodium fluoride and 21.1 grams (0.186 mol) of triethyl aluminum. The mixture was heated 140–145° C., measured on the thermometer and agitated at atmospheric pressure for about 10 minutes to preform the complex $2Et_3Al:NaF$.

35.3 grams (0.096 mol) of trioctyl aluminum was then added and the flask connected to a vacuum system capable of reducing the absolute pressure in the flask to 5 millimeters of mercury.

The mixture was then distilled without rectification at an oil bath thermometer reading of 140–145° C. and a vapor temperature of 100–110° C. at about 5 mm. of mercury absolute. 12.9 grams of distillate was obtained analyzing 94.3 mol percent $Et_3Al$ and 5.7 mol percent trioctyl aluminum (due largely to entrainment).

This distillate corresponds to 10.7 grams of triethyl aluminum (0.093 mol). The residue in the flask was $(C_8H_{17})_3Al:(C_2H_5)_3Al:NaF$. NMR (nuclear magnetic resonance analysis) was run on the distillate and on the residue confirming the presence in the residue of the complex shown.

EXAMPLE II

Example I was repeated with 4.5 grams (0.093 mol) of NaCN. 13 grams of distillate was obtained containing 90.0 mol percent triethyl aluminum and 10 mol percent trioctyl aluminum corresponding to 0.085 mol of triethyl aluminum distilled. The residue in the flask as determined by NMR was: $(C_8H_{17})_3Al:(C_2H_5)_3Al:NaCN$ containing a small amount of free $(C_2H_5)_3Al$.

EXAMPLE III

Example II was repeated with 70.6 grams (0.193 mol) of trioctyl aluminum. 13 grams of distillate containing 90 mol percent triethyl aluminum and 10 mol percent trioctyl aluminum was obtained corresponding to Example II; viz, 0.085 mol of triethyl aluminum removed showing removal from the complex of a maximum of 1 mol of triethyl aluminum, regardless of the amount of aluminum octyl added.

EXAMPLE IV

In a comparative example, Example II was repeated; however, the temperature of the thermometer of the oil bath was 170–180° C. and the vapor temperature was 125–130° C. Approximately 13 grams of material was obtained (70.0 mol percent triethyl aluminum, 10 mol percent aluminum octyl and 20 mol percent olefins). This shows the adverse effect of distilling at higher temperatures because of cracking the aluminum alkyls to produce olefins.

EXAMPLE V 0.1 mol of KCl is added to 0.2 mol of tripropyl aluminum and heated as above to produce the complex $2(C_3H_7)_3Al:KCl$. To this is added 0.2 mol of Al(tetradecyl)$_3$. Distillation is carried out at a pot oil bath thermometer temperature of 120–130° F. and a vapor temperature of 100–110° F. The distillate is 0.1 mol of tripropyl aluminum. The residue corresponds to $(C_3H_7)_3Al:(C_{14}H_{29})_3Al:KCl$.

EXAMPLE VI 0.10 mol of sodium phenoxide is added to 0.20 mol of triethyl aluminum and heated to 50° C. to produce the complex $2(C_2H_5)_3Al:Na$ phenoxide. To this is added 0.10 mol of $(C_{14}H_{29})_3Al$. Distillation is at an oil bath thermometer temperature of 120–130° C. at a vapor temperature of 100–110° C. and at a pressure of 5 mm. Hg absolute. Approximately 0.1 mol of $(C_2H_5)_3Al$ distills out producing a residue of $(C_2H_5)_3Al:(n-C_{14}H_{29})_3Al:Na$ phenoxide.

EXAMPLE VII

The foregoing Example VI is repeated except $(C_{18}H_{37})_3Al$ is used. Similar results are obtained.

EXAMPLE VIII 0.1 mol of sodium azide and 0.2 mol of $(C_4H_9)_3Al$ are heated as in the foregoing to prepare the complex $2(C_4H_9)_3Al:NaN_3$. 0.1 mol of $(C_{30}H_{61})_3Al$ is added to the complex and the mixture is distilled at a thermometer temperature of 180–190° C. at a pressure of 2 mm. of mercury absolute. Approximately 0.1 mol of $(C_4H_9)_3Al$ distills over. The residue has the formula $(C_4H_9)_3Al:(C_{30}H_{61})_3Al:NaN_3$

EXAMPLE IX

Example VIII is repeated using potassium azide to form the complex. A mixed long R-chain aluminum alkyl (R— average 16 carbon atoms per alkyl group, ranging from $C_6$ to $C_{30}$) (0.1 mol) is added to the complex. Approximately 0.1 mol of $(C_4H_9)_3Al$ is distilled at a pot oil bath thermometer temperature of 180–190° C. leaving behind the complex $(C_4H_9)_3Al:R_3Al:KN_3$.

EXAMPLE X 0.1 mol $NaOCH_3$ is added to 0.1 mol $(C_2H_5)_3Al$ and 0.1 mol $(C_3H_7)_3Al$ and is heated to produce the complex $(C_2H_5)_3Al:(C_3H_7)_3Al:NaOCH_3$. 0.1 mol of a mixed R— aluminum trialkyl as in Example IX is added and the resulting mixture distilled at a pot oil bath thermometer temperature of 130–140° C. The distillate contains approximately 0.1 mil of mixed ethylpropyl aluminum.

EXAMPLE XI

Example X is repeated except $NaN(CH_3)_2$ is used instead of $NaOCH_3$. Similar results are obtained.

EXAMPLE XII 0.05 mol of NaCN and 0.05 mol of KCN are added to 0.2 mol of $(C_2H_5)_3Al$ and heated to produce the 2:1 complex $2(C_2H_5)_3Al:\tfrac{1}{2}NaCN:\tfrac{1}{2}KCN$.

0.1 mol of $AlR_3$ where R— is $C_4H_9$— to $C_{30}H_{61}$—, average $C_{18}H_{37}$—, is added to the complex. The distillation is at an oil bath thermometer temperature of 120° C. and a vapor temperature of 100–110° C. at a pressure of 2 mm. of Hg absolute. 0.1 mol of $(C_2H_5)_3Al$ distills over.

The resultant composition of the complex is $(C_2H_5)_3Al:R_3Al:\tfrac{1}{2}NaCN:\tfrac{1}{2}KCN$ This is a 2:1 complex of proportions $1:1:\tfrac{1}{2}:\tfrac{1}{2}$.

The mixing of the 2:1 complexes and the trialkyl aluminum is considered to lead to the formation of an equilibrium mixture, typically:

$$2(R'')_3Al \cdot R_3Al : \frac{1}{t}MX_t + (R'')_3A$$

$$2(R'')_3Al + R_3Al \rightleftharpoons (R'')_3Al \cdot R_3Al : \frac{1}{t}MX_t + (R'')_3A$$

The distilling displaces the equilibrium by removing the most volatile component $(R'')_3Al$ overhead, thus driving the equilibrium reaction to completion.

From the foregoing, it is obvious that numerous variations are possible within the scope of the invention as disclosed in the present specification and claims. It is obvious to those skilled in the art that specific descriptions are exemplary and that the invention is not to be limited except as defined in the claims.

Typical and preferred experimental procedures for practicing the process and making and using the compositions have been disclosed to an extent wherein routine experimentation using the procedures discussed will enable anyone of ordinary skill in the art to practice the invention. Thus, for example, the suitability of any complexing agent from the viewpoints of forming complexes of useful desired properties and freedom from adverse reactivity such as peroxidic functions, reactive hydrogens, etc. is readily determined using the procedures described for making the complexing agents and complexes.

We claim:
1. A process for recovering a lower alkyl trialkyl aluminum having from about 2 to about 6 carbon atoms per

| Ex. | Complex Formula | Complex Mols | R₃Al Formula | R₃Al Mols | Temp. Pot °C | Temp. Vapor °C | Press. mm Hg | Distillate Formula | Distillate Mols | Residue Low (R''—) | Residue High (R—) | Complexing agent |
|---|---|---|---|---|---|---|---|---|---|---|---|---|
| 1 | 2(C₂H₅)₃Al·NaF | 0.093 | (C₈H₁₇)₃Al | 0.096 | 140–145 | 100–110 | 5 | (C₂H₅)₃Al | 0.093 | (C₂H₅)₃Al | (C₈H₁₇)₃Al | NaF. |
| 2 | 2(C₂H₅)₃Al·NaCN | 0.093 | (C₈H₁₇)₃Al | — | 140–145 | 100–110 | 5 | (C₂H₅)₃Al | 0.085 | (C₂H₅)₃Al | (C₈H₁₇)₃Al | NaCN. |
| 3 | 2(C₂H₅)₃Al·NaCN | 0.093 | (C₈H₁₇)₃Al | 0.192 | 140–145 | 100–110 | 5 | (C₂H₅)₃Al | 0.085 | (C₂H₅)₃Al | (C₈H₁₇)₃Al | NaCN (+free 1 mole (C₈H₁₇)₃Al). |
| 4 | 2(C₂H₅)₃Al·NaCN | 0.093 | (C₆H₁₃)₃Al | 0.096 | 170–180 | 120–130 | 5 | (C₂H₅)₃Al | 0.100 | (C₂H₅)₃Al | (C₆H₁₃)₃Al | KCl (plus free 1 mole (C₁₄H₂₉)₃Al). |
| 5 | 2(C₃H₇)₃Al·KCl | 0.100 | (C₁₄H₂₉)₃Al | 0.200 | 120–130 | 100–110 | 5 | (C₃H₇)₃Al plus olefins | 0.100 | (C₃H₇)₃Al | (C₁₄H₂₉)₃Al | |
| 6 | 2(C₂H₅)₃Al·NaOφ | 0.100 | (C₁₄H₂₉)₃Al | 0.100 | 120–130 | 100–110 | 5 | (C₂H₅)₃Al | 0.100 | (C₂H₅)₃Al | (C₁₄H₂₉)₃Al | NaOφ. |
| 7 | 2(C₂H₅)₃Al·KNaOφ | 0.100 | (C₁₈H₃₇)₃Al | 0.100 | 120–130 | 100–110 | 5 | (C₂H₅)₃Al | 0.100 | (C₂H₅)₃Al | (C₁₈H₃₇)₃Al | NaOφ. |
| 8 | 2(n-C₄H₉)₃Al·NaN₃ | 0.100 | (C₂₀H₄₁)₃Al | 0.100 | 180–190 | 130–140 | 2 | (n-C₄H₉)₃Al | 0.100 | (n-C₄H₉)₃Al | (C₂₀H₄₁)₃Al | NaN₃. |
| 9 | 2(n-C₄H₉)₃Al·KN₃ | 0.100 | R₃Al R = C₄–₃₀(ave.C₁₈) | 0.100 | 180–190 | 130–140 | 2 | (n-C₄H₉)₃Al | 0.100 | (n-C₄H₉)₃Al | R₃Al | KN₃. |
| 10 | 2(C₂H₅)₃Al·(C₂H₅)₃Al·NaOCH₃ | 0.100 | R₃Al R = C₄–₃₀(ave.C₁₈) | 0.100 | 130–140 | 110–120 | 5 | (C₂H₅)₃Al | 0.100 | (C₂H₅)₃Al | R₃Al | NaOCH₃. |
| 11 | (C₂H₅)₂Al·(C₂H₇)₂Al·NaN(CH₃)₂ | 0.100 | R₃Al R = C₄–₃₀(ave.C₁₈) | 0.100 | 130–140 | 110–120 | 5 | (C₂H₅)₃Al | 0.100 | (C₂H₅)₃Al | R₃Al | NaN(CH₃)₂. |
| 12 | 2(C₂H₅)₃Al·½NaCN·½KCN | 0.100 | R₃Al R = C₄–₃₀(ave.C₁₈) | 0.1 | 130–140 | 110–120 | 5 | (C₂H₅)₃Al | 0.100 | (C₂H₅)₃Al | R₃Al | NaCN:KCN. |
| 13 | 2(C₂H₅)₃Al·NaF | 0.1 | (C₁₀H₃₃)₃Al | 0.1 | 140 | 120 | 5 | (C₂H₅)₃Al | 0.1 | (C₂H₅)₃Al | (C₁₆H₃₃)₃Al | NaF. |
| 14 | 2(C₂H₅)₃Al·KF | 0.1 | (C₁₆H₃₃)₃Al | 0.1 | 140 | 120 | 5 | (C₂H₅)₃Al | 0.1 | (C₂H₅)₃Al | (C₁₆H₃₃)₃Al | KF. |
| 15 | 2(C₂H₅)₃Al·KCN | 0.1 | R₃Al R = C₄–₂₀(ave.C₁₀) | 0.1 | 120 | 100 | 5 | (C₂H₅)₃Al | 0.1 | (C₂H₅)₃Al | R₃Al | KCN. |
| 16 | 2(C₂H₅)₃Al·KOφ | 0.1 | R₃Al R = C₄–₂₀(ave.C₁₀) | 0.1 | 120 | 100 | 5 | (C₂H₅)₃Al | 0.1 | (C₂H₅)₃Al | R₃Al | KOφ. |
| 17 | 2(C₂H₅)₃Al·KOC₂H₅ | 0.1 | R₃Al R = C₄–₂₀(ave.C₁₀) | 0.1 | 120 | 100 | 5 | (C₂H₅)₃Al | 0.1 | (C₂H₅)₃Al | R₃Al | KOC₂H₅. |
| 18 | 2(C₂H₅)₃Al·KN(C₂H₅)₂ | 0.1 | R₃Al R = C₄–₂₀(ave.C₁₀) | 0.1 | 120 | 100 | 5 | (C₂H₅)₃Al | 0.1 | (C₂H₅)₃Al | R₃Al | KN(C₂H₅)₂. |
| 19 | 2(C₂H₅)₃Al·NaOC₂H₅ | 0.1 | R₃Al R = C₄–₂₀(ave.C₁₀) | 0.1 | 120 | 100 | 5 | (C₂H₅)₃Al | 0.1 | (C₂H₅)₃Al | R₃Al | NaOC₂H₅. |
| 20 | 2(C₂H₅)₃Al·½NaF·½KF | 0.1 | R₃Al R = C₄–₂₀(ave.C₁₀) | 0.1 | 120 | 100 | 5 | (C₂H₅)₃Al | 0.1 | (C₂H₅)₃Al | R₃Al | ½NaF:½KF. |
| 21 | 2(C₂H₅)₃Al·½NaF·½KCl | 0.1 | R₃Al R = C₄–₂₀(ave.C₁₀) | 0.1 | 140 | 100 | 2 | (C₂H₅)₃Al | 0.1 | (C₂H₅)₃Al | R₃Al | ½NaF:½KCl. |
| 22 | 2(C₂H₅)₃Al·½Ca(OCH₂CH₂OCH₃)₂ | 0.1 | R₃Al R = C₄–₂₀(ave.C₁₀) | 0.1 | 140 | 100 | 2 | (C₂H₅)₃Al | 0.1 | (C₂H₅)₃Al | R₃Al | ½Ca(OCH₂CH₂OCH₃)₂. |
| 23 | 2(C₂H₅)₃Al·½Mg(OCH₂CH₂OCH₃)₂ | 0.1 | R₃Al R = C₄–₂₀(ave.C₁₀) | 0.1 | 140 | 100 | 2 | (C₂H₅)₃Al | 0.1 | (C₂H₅)₃Al | R₃Al | ½Mg(OCH₂CH₂OCH₃)₂. |
| 24 | 2(C₂H₅)₃Al·NaF | 0.1 | R₃Al R = C₄–₃₀(ave.C₁₈) | 0.1 | 140 | 100 | 2 | (C₂H₅)₃Al | 0.1 | (C₂H₅)₃Al | R₃Al | NaF. |
| 25 | 2(C₂H₅)₃Al·KF | 0.1 | R₃Al R = C₄–₃₀(ave.C₁₈) | 0.1 | 140 | 100 | 2 | (C₂H₅)₃Al | 0.1 | (C₂H₅)₃Al | R₃Al | KF. |
| 26 | 2(C₂H₅)₃Al·KCN | 0.1 | R₃Al R = C₄–₃₀(ave.C₁₈) | 0.1 | 140 | 100 | 2 | (C₂H₅)₃Al | 0.1 | (C₂H₅)₃Al | R₃Al | KCN. |
| 27 | 2(C₂H₅)₃Al·KOφ | 0.1 | R₃Al R = C₄–₃₀(ave.C₁₈) | 0.1 | 180 | 140 | 2 | (C₂H₅)₃Al | 0.1 | (C₂H₅)₃Al | R₃Al | KOφ. |
| 28 | 2(C₂H₅)₃Al·KOC₂H₅ | 0.1 | R₃Al R = C₄–₃₀(ave.C₁₈) | 0.1 | 180 | 140 | 2 | (C₂H₅)₃Al | 0.1 | (C₂H₅)₃Al | R₃Al | KOC₂H₅. |
| 29 | 2(C₂H₅)₃Al·KN(C₂H₅)₂ | 0.1 | R₃Al R = C₄–₃₀(ave.C₁₈) | 0.1 | 180 | 140 | 2 | (C₂H₅)₃Al | 0.1 | (C₂H₅)₃Al | R₃Al | KN(C₂H₅)₂. |
| 30 | 2(C₂H₅)₃Al·NaOC₂H₅ | 0.1 | R₃Al R = C₄–₃₀(ave.C₁₈) | 0.1 | 180 | 140 | 2 | (C₂H₅)₃Al | 0.1 | (C₂H₅)₃Al | R₃Al | NaOC₂H₅. |
| 31 | 2(C₂H₅)₃Al·½NaF·½KF | 0.1 | R₃Al R = C₄–₃₀(ave.C₁₈) | 0.1 | 180 | 140 | 2 | (C₂H₅)₃Al | 0.1 | (C₂H₅)₃Al | R₃Al | ½NaF:½KF. |
| 32 | 2(C₂H₅)₃Al·½NaF·½KCl | 0.1 | R₃Al R = C₄–₃₀(ave.C₁₈) | 0.1 | 180 | 140 | 2 | (C₂H₅)₃Al | 0.1 | (C₂H₅)₃Al | R₃Al | ½NaF:½KCl. |
| 33 | 2(C₂H₅)₃Al·½Ca(OCH₂CH₂OCH₃)₂ | 0.1 | R₃Al R = C₄–₃₀(ave.C₁₈) | 0.1 | 180 | 140 | 2 | (C₂H₅)₃Al | 0.1 | (C₂H₅)₃Al | R₃Al | ½Ca(OCH₂CH₂OCH₃)₂. |
| 34 | 2(C₂H₅)₃Al·½Mg(OCH₂CH₂OCH₃)₂ | 0.1 | R₃Al R = C₆–₂₀(ave.C₁₈) | 0.1 | 180 | 140 | 2 | (C₂H₅)₃Al | 0.1 | (C₂H₅)₃Al | R₃Al | ½Mg(OCH₂CH₂OCH₃)₂. |
| 35 | 2(C₂H₅)₃Al·KF | 0.1 | (C₈H₁₇)₃Al | 0.1 | 120 | 110 | 5 | (C₂H₅)₃Al | 0.1 | (C₂H₅)₃Al | (C₈H₁₇)₃Al | KF. |
| 36 | 2(C₂H₅)₃Al·KCl | 0.1 | (C₁₀H₂₁)₃Al | 0.1 | 120 | 110 | 5 | (C₂H₅)₃Al | 0.1 | (C₂H₅)₃Al | (C₁₀H₂₁)₃Al | KCl. |
| 37 | 2(C₂H₅)₃Al·NaN₃ | 0.1 | (C₁₁H₂₃)₃Al | 0.1 | 120 | 110 | 5 | (C₂H₅)₃Al | 0.1 | (C₂H₅)₃Al | (C₁₁H₂₃)₃Al | NaN₃. |
| 38 | 2(C₂H₅)₃Al·½NaF·½KCN | 0.1 | (C₁₁H₂₃)₃Al | 0.1 | 120 | 110 | 5 | (C₂H₅)₃Al | 0.1 | (C₂H₅)₃Al | (C₁₁H₂₃)₃Al | ½NaF:½KCN. |
| 39 | 2(C₂H₅)₃Al·NaF | 0.1 | (C₁₂H₂₅)₃Al | 0.1 | 120 | 110 | 5 | (C₂H₅)₃Al | 0.1 | (C₂H₅)₃Al | (C₁₂H₂₅)₃Al | NaF. |
| 40 | 2(C₂H₅)₃Al·NaOφ | 0.1 | (C₁₄H₂₉)₃Al | 0.1 | 120 | 110 | 5 | (C₂H₅)₃Al | 0.1 | (C₂H₅)₃Al | (C₁₄H₂₉)₃Al | NaOφ. |
| 41 | 2(C₂H₅)₃Al·NaOCH₃ | 0.1 | (C₁₅H₃₁)₃Al | 0.1 | 120 | 110 | 5 | (C₂H₅)₃Al | 0.1 | (C₂H₅)₃Al | (C₁₅H₃₁)₃Al | NaOCH₃. |
| 42 | 2(C₂H₅)₃Al·KCN | 0.1 | (C₁₈H₃₇)₃Al | 0.1 | 120 | 110 | 5 | (C₂H₅)₃Al | 0.1 | (C₂H₅)₃Al | (C₁₈H₃₇)₃Al | KCN. |
| 43 | 2(C₂H₅)₃Al·KCN | 0.1 | (C₂₀H₄₁)₃Al | 0.1 | 120 | 110 | 5 | (C₂H₅)₃Al | 0.1 | (C₂H₅)₃Al | (C₂₀H₄₁)₃Al | KCN. |
| 44 | 2(C₂H₅)₃Al·NaCN | 0.1 | (C₂₄H₄₉)₃Al | 0.1 | 120 | 110 | 5 | (C₂H₅)₃Al | 0.1 | (C₂H₅)₃Al | (C₂₄H₄₉)₃Al | NaCN. |
| 45 | 2(C₂H₅)₃Al·NaCN | 0.1 | (C₃₀H₆₁)₃Al | 0.1 | 120 | 110 | 5 | (C₂H₅)₃Al | 0.1 | (C₂H₅)₃Al | (C₃₀H₆₁)₃Al | NaCN. | alkyl radical from a trialkyl aluminum mixture containing some of said lower alkyl radicals and some radicals having a greater number of carbon atoms per radical than the lower alkyl, the alkyl radicals of said mixture having from about 2 to about 30 carbon atoms per radical, which comprises
(a) combining said mixture with a complexing agent which complexes with alkyl aluminum in a 2:1 equivalent molar ratio to form a 2:1 ratio complex plus some alkyl aluminum in excess of that in the 2:1 ratio with the complexing agent, and
(b) distilling lower alkyl trialkyl aluminum from said mixture while retaining a distillation residue containing at least two mols of alkyl aluminum per equivalent mol of complexing agent.

2. The process of claim 1 wherein an equivalent mol of the complexing agent is:

$$\frac{1}{t} MX_t$$

wherein M is alkali metal or alkaline earth metal; and X is halogen, cyanide, alkyl radical having from about 2 to about 30 carbon atoms, cyanate, azide or substituted amide; and $t$ is a valence factor for M, being 1 where M is alkali metal and 2 where M is alkaline earth metal.

3. The process of claim 1 wherein the lower alkyl trialkyl aluminum is triethyl aluminum and the distilling step is performed at a vapor temperature of about 110° C. and at a pressure of about 5 millimeters of mercury absolute.

4. The process of claim 2 wherein X is alkyl radical having from about 2 to about 30 carbon atoms.

5. The process of claim 1 wherein the lower alkyl trialkyl aluminum is triethyl aluminum.

6. The process of claim 1 wherein the lower alkyl trialkyl aluminum is tripropyl aluminum.

7. The process of claim 1 wherein the lower alkyl trialkyl aluminum is diethyl n-butyl aluminum.

8. The process of claim 1 wherein the lower alkyl trialkyl aluminum is triethyl aluminum and the radicals having a greater number of carbon atoms per radical are one or a mixture of two or more higher alkyl radicals having from about 4 to about 30 carbon atoms per radical.

9. The process of claim 1 wherein the equivalent molar ratio of (1) the alkyl aluminum in the complex plus the free alkyl aluminum relative to (2) the complexing agent $$\frac{1}{t} MX_t$$

is from greater than 2 up to about 10.

10. A process for recovering triethyl aluminum from a 2:1 equivalent molar complex of:
(1) alkyl aluminum having from about 2 to about 30 carbon atoms per alkyl radical, at least some of said radicals being ethyl radicals and
(2) a complexing agent of the equivalent mol formula $$\frac{1}{t} MX_t$$

wherein M is alkali metal or alkaline earth metal; and X is halogen, cyanide, alkyl radical having from about 2 to about 30 carbon atoms, cyanate, azide or substituted amide; and $t$ is a valence factor for M, being 1 where M is alkali metal and 2 where M is alkaline earth metal, which comprises:
(a) adding to said complex alkyl aluminum whose alkyl radicals have from about 3 to about 30 carbon atoms per radical to form a mixture containing the 2:1 equivalent molar complex plus free alkyl aluminum, and
(b) distilling triethyl aluminum from said mixture while retaining a distillation residue which has at least two mols of alkyl aluminum per equivalent mol of complexing agent.

11. The process of claim 10 wherein about 50 percent of the alkyl radicals of the complex is ethyl radicals.

12. The process of claim 10 wherein about 100 percent of the alkyl radicals of the complex is ethyl radicals.

13. The process of claim 1 wherein the distilling step is performed at a vapor temperature from about 80° C. to about 175° C. and at a pressure from about 1.0 to about 70 millimeters of mercury absolute and below the pyrolysis temperature for the conversion of the 2:1 molar complex into a 1:1 molar complex.

14. The process of claim 1 wherein the distilling step is performed at a vapor temperature from about 90° C. to about 125° C. and at a pressure from about 2 to about 20 millimeters of mercury absolute.

15. The process of claim 2 wherein M is alkali metal and $t$ is 1.

16. The process of claim 2 wherein M is sodium or potassium.

17. The process of claim 2 wherein M is sodium.

18. The process of claim 2 wherein X is halogen.

19. The process of claim 2 wherein X is fluoride, cyanide, phenoxy, methoxy, or azide.

20. The process of claim 2 wherein X is fluoride.

21. The process of claim 2 wherein X is cyanide.

22. The process of claim 2 wherein X is phenoxy.

23. The process of claim 2 wherein MX is sodium fluoride.

24. The process of claim 2 wherein MX is sodium phenoxide.

25. The process of claim 2 wherein MX is sodium methoxide.

26. The process of claim 1 wherein the steps (a) and (b) are performed in two separate stages.

27. The process of claim 1 wherein the steps (a) and (b) are performed in a countercurrent contacting in a packed or staged bed or tower contacting system.

28. An exchange process for forming complexes containing $R_3Al$ wherein R is an individual alkyl radical having from about 4 to about 30 carbon atoms or a mixture of two or more thereof comprising:
(a) reacting $R_3Al$ and a 2:1 molar complex of the type:

$$a(R'')_3Al:bR_3Al:\frac{1}{t} MX_t$$

wherein
M is alkali metal,
$t$ is 1,
X is fluoride, phenoxy, methoxy, cyanide, cyanate, azide or substituted amide,
R'' is an individual lower alkyl radical having from about 2 to about 6 carbon atoms or a mixture of two or more thereof, wherein at least one component $(R'')_3Al$ compound is more volatile than $R_3Al$,
$a$ is from $>1$ up to 2, inclusive,
$a+b=2$,
at a temperature from about 0 to about 190° C. at a pressure from about 5 p.s.i.a. to about 100 p.s.i.a. and for a time from about 0.1 second to about 1 hour, and
(b) distilling $(R'')_3Al$ at a temperature from about 80° to about 175° C. and at a pressure from about 1.0 to about 70 mm. Hg absolute to remove at least a part of the $(R'')_3Al$ produced by the reaction leaving a 2:1 complex of the type:

$$a'(R'')_3Al:b'R_3Al:\frac{1}{t} MX_t$$

wherein
$a'+b'=2$
$a'/b'<a/b$.

29. The process of claim 28 wherein the reacting step is at a temperature from about 75 to about 150° C. at a pressure from about 10 p.s.i.a. to about 20 p.s.i.a. and at a time from about ½ second to about 15 minutes.

30. The process of claim 28 wherein the reacting step is at a temperature of about 125° C., at about atmospheric pressure and at a time of about 5 minutes.

31. The process of claim 10 wherein the complexing agent is sodium fluoride.

32. An exchange process for forming complexes containing $R_3Al$ wherein R is individual alkyl radical having from about 4 to about 30 carbon atoms, comprising:

(a) reacting $R_3Al$ and a complex of the type $$2(R'')_3Al : \frac{1}{t} MX_t$$

wherein
M is alkali metal,
$t$ is 1,
X is fluoride, phenoxy, methoxy, cyanide, cyanate, and
R'' is ethyl or propyl radical, or a mixture thereof,
to produce $(R'')_3Al$ plus a complex of the type $$(R'')_3Al(R)_3Al : \frac{1}{t} MX_t$$

at a temperature from about 0 to about 190° C., at a pressure from about 5 p.s.i.a. to about 100 p.s.i.a. and at a time from about 0.1 second to about 1 hour, (b) and then distilling $(R'')_3Al$ at a temperature from about 80° to about 175° C. and at a pressure from about 1.0 to about 70 mm. of Hg absolute to remove at least a part of the $(R'')_3Al$ produced by the reaction leaving a 2:1 complex of the type:

$$(R'')_3Al : R_3Al : \frac{1}{t} MX_t$$

33. The process of claim 32 further characterized in that the complex $$(R'')_3Al : R_3Al : \frac{1}{t} MX_t$$

is reacted with ethylene under ethylene displacement conditions to regenerate the complex $$2(R'')_3Al : \frac{1}{t} MX_t$$

and liberate olefins (R—H).

34. A composition of the formula $$2(C_2H_5)_3Al : \tfrac{1}{2} Ca(OCH_2CH_2OCH_3)_2$$

35. A composition of the formula $$2(C_2H_5)_3Al : \tfrac{1}{2} Mg(OCH_2CH_2OCH_3)_2$$

References Cited

UNITED STATES PATENTS 3,415,862  12/1968  Ziegenhain _____ 260—448 A
3,367,989  2/1968   Scoggins _____ 260—448 A X

OTHER REFERENCES

Swift et al., Inorganic Chemistry, vol. 5, pp. 2048 to 50 (1966).

Ziegler et al., Index Chemicus, Art. No. 848 (1961).

JAMES E. POER, Primary Examiner

H. M. S. SNEED, Assistant Examiner